United States Patent Office 3,513,055
Patented May 19, 1970

3,513,055
METHOD OF PREPARING HEAT-SEALABLE COMPOSITE SHEETS
Wilbur T. Brader, Jr., Swarthmore, and Charles M. Rosser, Wallingford, Pa., assignors to FMC Corporation, Philadelphia, Pa., a corporation of Delaware
No Drawing. Filed Nov. 12, 1964, Ser. No. 410,768
Int. Cl. C09j 5/00, 5/02
U.S. Cl. 156—307                    6 Claims

ABSTRACT OF THE DISCLOSURE

A method of preparing heat-sealable composite sheets wherein a flexible cellulosic base sheet is treated with a combination of polyalkylenimine and an inorganic, water-soluble oxidizing agent, and the resulting sheet laminated or coated with a resinous material, is disclosed herein.

---

The anchoring of the thermoplastic coatings to cellulosic base members with intermediate thin layers of polyalkylenimines is known.

It is a primary object of this invention to provide an improved method of anchoring vinyl resin coatings or films to flexible cellulosic base members utilizing polyalkylenimines.

These and other objects are accomplished in accordance with the present invention which is a method of preparing a composite sheet which comprises treating a flexible cellulosic base sheet with a solution containing a polyalkylenimine and into which an inorganic water-soluble oxidizing agent has been introduced, drying the base sheet, and applying a film to said base sheet of a resin selected from the group consisting of polyvinyl chloride, interpolymers consisting predominantly of vinyl chloride and interpolymers consisting predominantly of vinylidene chloride.

The base sheets which are intended for this invention include for example, films and fabrics of regenerated cellulose, cellulose ethers and esters, paper and the like. Of primary importance for heat-sealable wrapping material is the regenerated cellulose film.

The polyalkylenimine and oxidizing agent are advantageously applied to the base material in an aqueous medium. The anchoring ingredients may, in fact, be included in an aqueous plasticizing bath through which wet gel film is run after being manufactured. While water is the preferred carrying medium other liquids such as water-miscible alcohols may be used to dissolve the polyalkylenimine. The water-soluble oxidizing agent may then be dissolved in water and the solution admixed with the aloholic-polyalkylenimine solution.

Polyethylenimine is the preferred imine of this invention however homologues including polypropylenimine, polypropylenethylenimine and polybutylenimine are also useful.

Polyethylenimines having insufficient molecular weights as indicated by specific viscosities below 0.15 are not useful. There appears to be no upper limit in molecular weight in commercially obtainable water-soluble polyalkylenimines known that would restrict their use in practicing this invention. The polyalkylenimine is preferably incorporated in the solution in concentrations ranging from about 0.05 to 1.0% based on the weight of the solution.

The inorganic water-soluble oxidizing agents which are useful for this invention include for example, ammonium and alkali metal perborates, hypochlorites, perchlorates, persulfates, oxalates, chromic acid and peracetic acid. The oxidizing agent is introduced into the treating solution in an amount ranging from 0.01 up to 1.0% based on the weight of the solution. It is also preferably used at at ratio of polyalkylenimine to oxidizing agent of from about 1½ or 2 to 1. The preferred oxidizing agent has been found to be sodium perborate.

Resin films which are applied to the treated base sheet include the homopolymer of vinyl chloride, interpolymers of vinyl chloride with copolymerizable monomers and interpolymers of vinylidene chloride and copolymerizable monomers. Useful copolymerizable monomers include, for example, vinyl acetate, vinyl propionate, acrylonitrile, methacrylonitrile, acrylic acid, methacrylic acid, methyl acrylate, butyl acrylate, ethylhexyl acrylate, ethyl methacrylate, butyl methacrylate, octyl methacrylate and the like. It is preferred that the vinyl chloride and vinylidene chloride components be present in their respective interpolymer systems in amounts over 75% by weight. Resin modifiers, such as maleic anhydride may be used in the preparation of the vinyl resins.

The resins may be applied as preformed films or preferably as coatings from hot melts, solutions or aqueous dispersions. Resin coating compositions may contain various additives which improve surface characteristics or blending properties. Mixtures of the above type resins may also be used.

The following examples are set forth to demonstrate this invention.

EXAMPLE I 0.1% by weight of polyethylenimine was added to a water bath containing 5% by weight of glycerol. To another bath of the same consistency, 0.06% by weight of sodium perborate was additionally incorporated. Wet gel regenerated cellulose films were dipped into each of these baths for about 15 seconds and then air-dried. After drying, the films were cured for three minutes at 90° C.

Films treated in both ways were then coated either with (1) a coating composition containing 10 parts of a copolymer of 90 wt. percent vinylidene chloride and 10 wt. percent acrylonitrile, 0.25 part of a substitute ethylene diamine, and 0.1 part clay dispersed in an organic solvent at a solids concentration of 20%, or (2) a coating composition of 50 parts of an interpolymer of 86% vinyl chloride, 13% vinyl acetate and 1% maleic anhydride, 50 parts of an interpolymer of 87% vinyl chloride and 13% vinyl acetate, 4 parts paraffin wax, 5 parts of a polymerized rosin and 0.6 part clay dispersed in an organic solvent at a solids concentration of 15% by weight. The films were then dried and subjected to test procedures to determine anchor or bonding strength.

The Dry Sealed Coating test involved heat sealing together two strips of the same test sample, coating to coating, to provide a two-inch seal. One of the strips has had a section of coating removed therefrom and the other strip is positioned so that it will pull against an exposed edge of the coating when the two strips are pulled apart. The ends of each strip are left unsealed. The ends of each strip are attached to the Suter Tester apparatus which measures the force in grams necessary to pull the members apart. This method gives an accurate measure of the force necessary, under dry conditions to pull the coating from the base sheet.

The Boiling Water test involved heat sealing two strips together as described above for the Dry Sealed Coating test. One unsealed end is clamped at a fixed position, while the other end has a hanging weight clamped thereon. The heat-sealed portion is immersed in boiling water. At the time of immersion a stop watch is started and the length of time in seconds necessary to strip the two inches of coating is recorded.

The film samples coated with vinylidene chloride copolymer showed the following test results.

| Test | Anchor treatment | |
|---|---|---|
| | PEI [1] | PEI+Ox.[2] |
| Dry sealed coating, gms | 238 | 250 |
| Boiling water, sec | 111 | 168 |

[1] Polyethylenimine.
[2] Polyethylenimine+oxidizing agent (sodium perborate).

The film samples coated with the vinyl chloride copolymer showed the following test results.

| Test | Anchor treatment | |
|---|---|---|
| | PEI | PEI+Ox. |
| Dry sealed coating, gms | 89 | 224 |
| Boiling water, sec | 79 | 91 |

EXAMPLE II

The very same procedure was carried out as in Example I except that sodium perborate was replaced with 0.08% sodium hypochlorite prepared by bubbling chlorine gas through sodium hydroxide.

The film samples were coated as in Example I and samples coated with the vinylidene chloride copolymer showed the following test results.

| Test | Anchor treatment | |
|---|---|---|
| | PEI [1] | PEI+Ox |
| Dry sealed coating, gms | 238 | 255 |
| Boiling water, sec | 111 | 169 |

[1] Polyethylenimine+oxidizing agent (sodium hypochlorite).

The film samples coated with the vinyl chloride copolymer showed the following test results.

| Test | Anchor treatment | |
|---|---|---|
| | PEI | PEI+Ox. |
| Dry sealed coating, gms | 89 | 143 |
| Boiling water, sec | 79 | 98 |

EXAMPLE III

The same procedure was carried out as in Example I except that sodium perborate was replaced with 0.06% of chromic acid ($CrO_3$).

The film samples were coated as in Example I with the vinylidene chloride copolymer and showed the following test results.

| Test | Anchor treatment | |
|---|---|---|
| | PEI | PEI+Ox. |
| Dry sealed coating, gms | 238 | 408 |
| Boiling water, sec | 111 | 201 |

Various changes and modifications may be made practicing the invention without departing from the spirit and scope thereof and, therefore, the invention is not to be limited except as defined in the appended claims.

We claim:
1. A method of preparing a composite sheet which comprises treating a flexible cellulosic base sheet with a solution containing a polyalkylenimine having a specific viscosity of at least 0.15 in an amount ranging from 0.05 to 1% based on the weight of the solution to improve adhesion of resin films to said base sheet and into which an inorganic water-soluble oxidizing agent from the group consisting of ammonium and alkali metal perborates, hypochlorites, perchlorates, persulfates, oxalates, chromic acid and peracetic acid has been introduced in an amount ranging from 0.01 up to 1% based on the weight of the solution to further improve adhesion of films to said base sheet, drying the base sheet, and applying a film to said base sheet of a resin selected from the group consisting of polyvinyl chloride, interpolymers consisting predominantly of vinyl chloride and interpolymers consisting predominantly of vinylidene chloride.

2. The method of claim 1 wherein the cellulosic base sheet is non-fibrous regenerated cellulose.

3. The method of claim 2 wherein the solution contains from 0.025 to 1.0% by weight of said oxidizing agent.

4. The method of claim 3 wherein the polyalkylenimine is polyethylenimine and the oxidizing agent is sodium perborate.

5. The method of claim 4 wherein the resin film is an interpolymer consisting predominantly of vinyl chloride.

6. The method of claim 4 wherein the resin film is an interpolymer consisting predominantly of vinylidene chloride.

References Cited

UNITED STATES PATENTS

| 3,037,835 | 6/1962 | Bonvieini et al. | 260—898 |
| 3,297,476 | 1/1967 | Kane. | |
| 2,261,294 | 11/1941 | Schlack | 8—100 |
| 2,261,295 | 11/1941 | Schlack | 8—116.2 |
| 2,999,782 | 9/1961 | Justice et al. | 156—331 |
| 3,009,831 | 11/1961 | Wilfinger | 117—145 |
| 3,111,418 | 11/1963 | Gilbert et al. | |

FOREIGN PATENTS 782,455  9/1957  Great Britain.

ROBERT F. BURNETT, Primary Examiner
R. J. ROCHE, Assistant Examiner

U.S. Cl. X.R.

117—60, 76, 144, 145; 156—331; 161—247, 249

UNITED STATES PATENT OFFICE
CERTIFICATE OF CORRECTION

Patent No. 3,513,055          Dated May 19, 1970

Inventor(s) Wilbur T. Brader, Jr. and Charles M. Rosser

It is certified that error appears in the above-identified patent and that said Letters Patent are hereby corrected as shown below:

Column 1, line 55, change "loholic" to --coholic--. Column 2, line 4, change "at" to --a--. Column 3, line 30, change "$PEI^1$ PEI + Ox." to --PEI PEI + $Ox.^1$--. Column 4, line 40, after "Kane" insert --117-47 --; line 45, after "Gilbert et al" insert --117-47 --; line 48, after "Britain" insert --117-60--.

SIGNED AND SEALED

OCT 27 1970

(SEAL)
Attest:

Edward M. Fletcher, Jr.
Attesting Officer

WILLIAM E. SCHUYLER, JR.
Commissioner of Patents